United States Patent Office 3,436,238
Patented Apr. 1, 1969

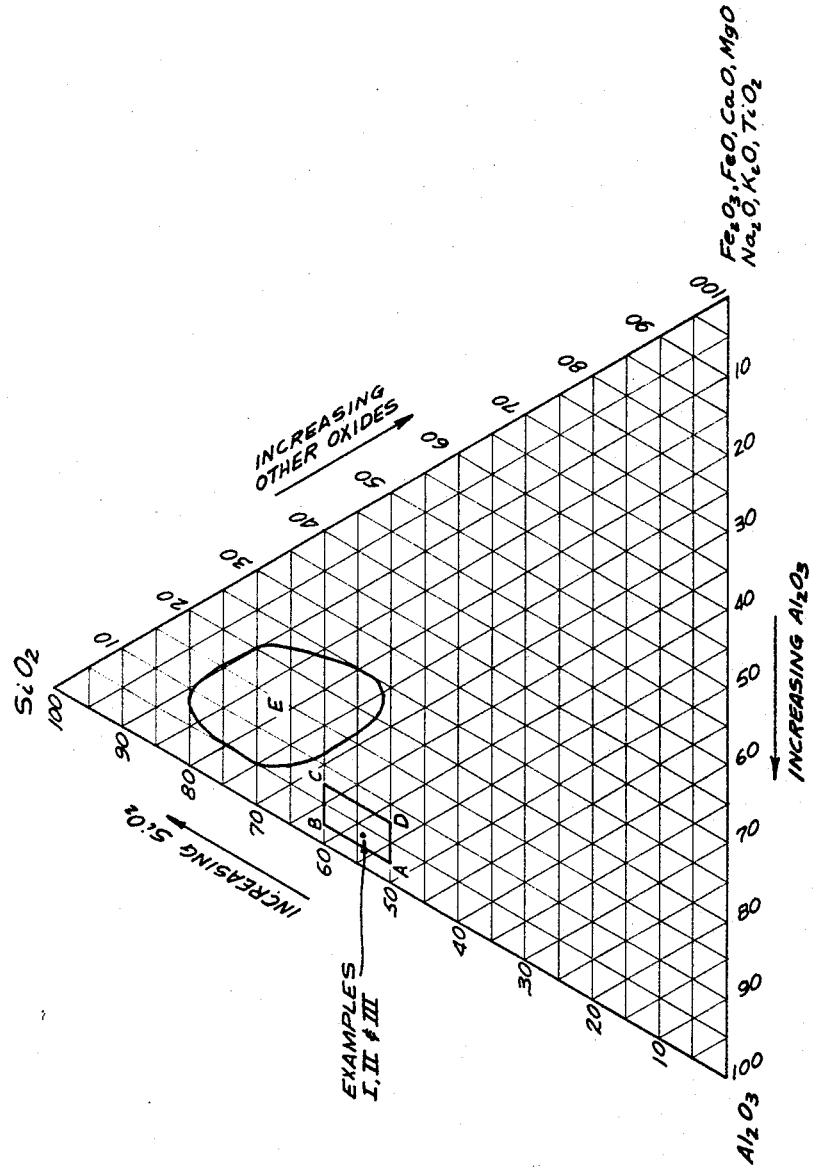

3,436,238
LIGHTWEIGHT REFRACTORY BRICK AND AGGREGATE
George H. Criss, Bethel Park, Pa., assignor to Dresser Industries, Inc., a corporation of Delaware
Filed July 23, 1965, Ser. No. 474,285
Int. Cl. C04b 35/68, 35/66
U.S. Cl. 106—64                     7 Claims

ABSTRACT OF THE DISCLOSURE

Method of making a lightweight refractory aggregate analyzing about 50 to 60% $SiO_2$, 40 to 50% $Al_2O_3$, between 2.5 and 7.5% other oxides, total alkalies and alkaline earth oxides less than about 1%, titania less than about 2% in a rotary kiln at temperatures in excess of 2900° F. Lightweight fireclay brick including said lightweight refractory aggregate and lightweight monolithic refractory compositions including said lightweight aggregate.

---

This invention relates to lightweight refractory aggregates, and to low density refractory brick and monolithic refractories made therefrom. More particularly, this invention relates to refractory fireclay aggregate expanded in rotary kilns and processed to refractory brick and monolithic products.

Lightweight aggregate is a term used in the art to define low density materials that can be incorporated in brick or monolithic materials to impart low bulk density. The broad term lightweight aggregate includes a wide variety of materials, some refractory products, and others not refractory. The large majority of lightweight aggregates are of the nonrefractory type and are used as ingredients in concrete block and concrete monolithic structures by the building industries. This invention, however, relates to the refractory lightweight aggregates used for the brick and monolithic linings of high-temperature furnaces.

There are two major categories of lightweight aggregates including natural and processed. Natural lightweight aggregates include pumice and scoria (volcanic cinder). Processed or manufactured lightweight aggregates include perlite, vermiculite, expanded clay, shales, slate, blast furnace slag, and coal cinders. The natural aggregates, pumice and scoria, require no treatment except crushing and screening. Their alkali content, between about 5 and 10%, by weight, makes these materials unsatisfactory as refractory aggregates. Vermiculite is a term given a group of hydrous micas characterized by the ability, when heated above 300° F., to expand at right angles to the cleavage to a volume of 6 to 20 times that of the unexpanded mineral. It has a specific gravity after expansion of about 0.9 gm./cc. Vermiculite has been used as a lightweight aggregate in certain insulating applications, but is very weak and friable. Its melting point between 2400 and 2450° F. makes it unsuitable for many refractory purposes. Perlite is a highly siliceous material that will expand up to 20 times in volume when heated to a point in its softening range (about 1200° F.) which is unsatisfactory for refractory aggregates. Expanded blast furnace slags and coal cinders used as lightweight aggregates have a variety of properties. Generally they have low softening points. Expanded argillaceous materials (clay, shale, and slate) are more directly related to this invention than any of the lightweight aggregates enumerated above. Many expand or bloat when heated between 1600 and 2400° F. They usually contain 6% or more iron oxide and approximately 6% alkalies and alkaline earths. These expanded argillaceous materials are generally unsatisfactory as lightweight refractory aggregates because of their low softening temperatures.

The process of expanding clay or shale was first developed in 1917. Steffan J. Hayde found that heating certain shales, clays, and slates to incipient fusion produced a lightweight aggregate of high structural strength and insulating ability. The process was patented (United States Patent No. 1,707,395) and the aggregate was named "Haydite." Hayde taught that temperatures of not less than 1500° F. and generally 1700° F. to approximately 2500° F. were suitable for most raw materials to produce the desired expansion. Since the Hayde patent, a considerable number of related processes have been developed, all of which contemplate the manufacture of lightweight aggregate for the structural concrete industries.

It is, therefore, an object of this invention to produce a lightweight refractory aggregate by expanding argillaceous materials at a temperature above about 2900° F.

It is another object of this invention to produce a lightweight refractory brick made with a lightweight refractory aggregate.

It is a further object of this invention to manufacture monolithic refractory materials containing a lightweight refractory aggregate.

Briefly, according to one aspect, this invention is accomplished by heating an argillaceous material in a rotary kiln in excess of 2900° F. in an atmosphere containing more than about 5% oxygen. The argillaceous material should contain between 50 and 60% silica, 40 to 50% alumina, and between 2½ and about 7½ % other oxide including iron oxide, alkaline earth oxides, alkalies, and titania. The total alkalies and alkaline earth should be less than about 1%. The total titania should be less than about 2%.

To produce a lightweight refractory brick the aggregate is sized and graded to form a refractory batch which will also include plastic bond clay and tempering agents such as lignin liquor and water. The refractory batch is shaped into brick as, for example, by pressing at 4000 p.s.i. After drying the brick at about 250° F. for about 5 hours the brick are then burned, for example, to pyrometric cone 15 (which is approximately 2600° F.) for a 10-hour hold.

Monolithic refractory materials containing the lightweight refractory aggregate are manufactured by forming a size graded refractory batch including, for example, the aggregate, plastic bond clay, and calcium aluminate cement.

The attached diagram is a ternary diagram representing the chemical analyses of argillaceous materials. This diagram utilizes the principles which characterize all such three component charts. In the diagram, each side of an equilateral triangle is divided into 100 parts, each fifth part being intersected by lines parallel to each of the other two sides. A point at any corner represents 100% of one of the three components. For example, in the diagram the apex represents 100% silica. The lower lefthand corner represents 100% alumina and the lower right-hand corner represents 100% of the oxides present in the brick other than silica and alumina.

In any ternary diagram, the three sides are binary systems. For example, a point along the lefthand base line is composed exclusively of the lower left corner and apex components alumina and silica.

The relative distance of the point, such as A, from each of the three corners may be expressed as a percentage and it thus may represent a percentage composition of a ternary mixture or solution in terms of the components of the corners. Therefore, the composition of A is 50% silica, 47½% alumina, and 2½% of other constituents ($Fe_2O_3$, FeO, CaO, MgO, $Na_2O$, $K_2O$, and $TiO_2$). The circular area in the center of the diagram marked E represents the argillaceous material that the prior art has taught to be good for the production of lightweight aggregates. The area A–B–C–D represents the chemical analyses of the argillaceous materials used in the practice of this invention.

The precise mechanisms of the bloating which produces lightweight aggregates is not fully understood. Generally, two conditions must be fulfilled before bloating can take place during the firing of argillaceous materials. Sufficient material must fuse to seal the pore walls so that the gases being formed in situ will be trapped. The fused material must, of course, be viscous enough so that the gas does not escape by bubbling through it. The second condition is that some mineral, or combination of minerals, must be present that will dissociate and liberate gas in situ at the time when the mass of argillaceous material has begun to fuse.

The source of the gases formed in situ may be several. $CO_2$ from various carbonates (calcite, dolomite, and siderite) is a possible source. Oxidation of organic carbon is another. Iron compounds are a probable source of oxygen, which would produce—depending on the composition of the organic matter present for oxidation—water, $CO_2$, $H_2S$, $SO_3$, and $SO_2$.

Riley [1] gives a composition diagram of the major oxides showing the area in which the clays fired to a mass viscous enough to insure good bloating. White [2] gives a similar diagram. The Riley and White areas are superimposed on the diagram and are the area E.

I have found that expansion is obtained with argillaceous materials which lie in the area A–B–C–D on the diagram. They are substantially outside that used by the prior art. However, the diagram alone does not describe with a sufficient degree of specificity the argillaceous materials used in the practice of this invention. The materials in the lower right-hand corner of the diagram (iron oxides, alkaline earths, and alkalies and titania) must be within certain limits. The alkalies and alkaline earths must be less than about 1%. The titania must be less than about 2%. There does not appear to be a limit on the iron oxides except that the total impurities must not exceed 7½%. The reasons for these limits will become more clear by a study of the examples given below.

The following examples are given by way of illustration and not by way of limitation so that those skilled in the art may more accurately understand this invention.

Examples I, II, and III

Three Pennsylvania hard clays that are used for the manufacture of super duty refractory fire brick were selected for bloating trials. The three clays had the chemical analyses on an oxide basis by weight, calcined and uncalcined, given in Table I.

TABLE I
[Percent]

| | Example No. | | | | | |
|---|---|---|---|---|---|---|
| | I | | II | | III | |
| | Dry | Calcined | Dry | Calcined | Dry | Calcined |
| Silica ($SiO_2$) | 45.0 | 52.1 | 43.9 | 50.8 | 44.5 | 51.4 |
| Alumina ($Al_2O_3$) | 37.6 | 43.5 | 38.6 | 44.7 | 38.1 | 44.0 |
| Titania ($TiO_2$) | 1.6 | 1.9 | 2.2 | 2.5 | 2.1 | 2.4 |
| Iron oxide ($Fe_2O_3$) | 1.5 | 1.7 | 1.1 | 1.3 | 1.0 | 1.2 |
| Lime (CaO) | 0.23 | 0.27 | 0.20 | 0.23 | 0.41 | 0.47 |
| Magnesia (MgO) | 0.21 | 0.24 | 0.19 | 0.16 | 0.16 | 0.18 |
| Soda ($Na_2O$) | 0.22 | 0.02 | 0.03 | 0.03 | 0.03 | 0.03 |
| Potash ($K_2O$) | 0.23 | 0.27 | 0.33 | 0.38 | 0.33 | 0.38 |
| Lithia ($Li_2O$) | 0.04 | 0.04 | 0.07 | 0.08 | 0.05 | 0.06 |
| | | 0.84 | | 0.88 | | 1.12 |
| Loss on ignition | 13.6 | | 13.4 | | 13.4 | |
| Total | 100.0 | | 100.0 | | 100.0 | |

[1] Riley, C. M., "Relation of Chemical Properties to Bloating of Clays," Journal American Ceramic Society, 34, pp. 121–128 (1951).
[2] White, Walter, "Lightweight Aggregate From Illinois Shales," Circular 290, Illinois State Geological Survey (1960).

All clays were crushed so that 90% passed 1½" screens and were screened to remove minus 4 mesh material. These clays were then fed, one at a time, into a rotary kiln. A rotary kiln resembles a long metal drum with a brick lining. The kiln may be from 6 to about 10 feet in diameter and 40 to 100 feet in length (or much longer), and mounted slightly off horizontal. At the lower end of the kiln is a port containing burners for firing the fuel. Raw materials, steadily entering at the high end of the slowly revolving kiln, gradually travel to the hot zone at the lower end. The temperature in the hot zone and the revolving rate are coordinated so that the bloating occurs at the optimum temperature and for the optimum length of time.

The optimum residence time and temperature for the expansion of the clays of Examples I, II, or III was one hour above about 2900° F. This was predetermined by draw trials in a small laboratory furnace. Expansion is not the only consideration. It is crucial that the clays not stick to the sides of the rotary kiln when being bloated, but that they flow freely.

When the clay of Example I was fed to the rotary kiln, the kiln could be operated at a temperature exceeding 2900° F. without appreciable sticking. The bulk density of the product was from 1.63 to 1.72 gm./cc. When the clays of Examples II and III were fed to the rotary kiln, considerable sticking and balling occurred when the kiln temperature exceeded 2800° F. It was therefore necessary to make both runs at or near 2800° F., below the optimum bloating temperature; and, as a result, the bulk densities of both products ranged from 1.86 to 2.00 gm./cc., higher than desired for a lightweight aggregate.

The clays of Examples I, II, and III all contained about the same amount of alumina, silica, and total of other oxides. This would put them all at the same point on the diagram. However, while the three clays all contained about the same total amount of other oxides, they differed in type. In Example I (according to this invention), the alkalies and alkaline earths were less than 1% and the titania less than 2% of the total. When these limits were exceeded in Examples II and III, the refractoriness of the clays was too low to permit good expansion at temperatures over about 2900° F. without considerable sticking.

Applicant has discovered a unique combination of oxides in a highly refractory argillaceous material which will, upon heating to 2900° F. in a rotary kiln, fuse sufficiently to enable gases formed in situ to bloat the clay but which do not make the aggregate sticky causing adherence to the sides of the rotary kiln.

The kiln runs described above were all made with 5 to 10% excess oxygen. The material of Example I was rerun under more reducing conditions, in which the excess oxygen was between 1 and about 5%. Under these conditions, the hot zone temperature could not be raised above approximately 2860° F. without sticking and balling occurring. The bulk density of the bloated clay ranged from 1.77 to 1.92 gm./cc. This was considerably higher than the more oxidizing run where the bulk specific gravities ranged from 1.63 to 1.72. The reasons for the sticking and balling in the second run are not known. However, it is suggested that localized areas of reducing conditions existed in the kiln resulting in sticking at lower temperatures.

Example IV

The expanded fireclay aggregate of Example I was sized and graded and combined with 5% plastic bond clay and tempering agents, for example lignin liquor, to form the refractory batch given in Table II. The refractory batch was then shaped into brick by pressing at about 4000 p.s.i. After drying at about 250° F. for 5 hours, the brick were given a cone 15 burn which is about 2600° F.

with a hold time of 10 hours. The details of manufacture are given in the following table.

TABLE II

Base mix

| Expanded fireclay aggregate | Percent |
|---|---|
| −4+10 mesh | 21 |
| −10+28 mesh | 22 |
| −28+65 mesh | 16 |
| −65 mesh | 36 |
| Plastic bond clay | 5 |
|  | 100 |

Additives

| | |
|---|---|
| Lignin liquor | 6 |
| Water | 5 |

The brick made according to Example IV had unusual properties. These properties are tabulated in Table III, along with the ASTM specifications for high-duty fireclay brick and typical data for high-duty brick.

TABLE III

| | Example IV | Typical High Duty Brick | ASTM Specification C-27-60 [1] |
|---|---|---|---|
| Bulk Density, p.c.f. | 100 | 135-139 | [2] 137 |
| Panel Spalling Loss, at 2,910° F. (ASTM C-107-52), percent | 3.3 | 5-12 | [3] 10 |
| Modulus of Rupture, p.s.i. | 870 | 900-1,500 | 500 |
| Cold Crushing Strength, p.s.i. | 3,140 | 2,000-3,500 | 500 |
| Load Test (ASTM C-16-62), 25 p.s.i.: Percent Linear Subsidence at 2,460° C. | 0.9 | 1.5-2.5 | |
| Pyrometric Cone Equivalent (ASTM Test C-24-56) | 32½-33 | 32½-33 | 31½ |
| Thermal Conductivity (Average From Room Temperature To 2,300° F.), B.t.u./hr./sq. ft./° F./in. of thickness | 8 | 9.5-10.5 | |

[1] For high duty spall-resistant brick.
[2] Minimum.
[3] Maximum.

Example IV with a bulk density considerably lower than typical high duty fireclay brick has properties as good or better. The hot compressive strength of Example IV, as determined by the load test, is better than typical high duty fireclay brick. This will enable its use in applications where high-temperature structural strength is required, with the added advantage of the low thermal conductivity. This is highly desirable because firelay brick are used to line furnaces maintained at elevated temperatures. The low thermal conductivity of brick made according to Example IV will cut down heat losses and save fuel costs.

A plastic bond clay is a fireclay of sufficient natural plasticity to bond nonplastic materials. Such clays would include air-floated ball clays which are exceptionally good for imparting plasticity.

The quantity of plastic bond clay used in the batch can be varied somewhat without changing the properties considerably. No less than about 2% and no more than about 10% is preferred. However, the grind of the fireclay aggregate can also vary, but at least about 35% should rest on a 28 mesh screen and at least about 30% should pass a 65 mesh screen.

Examples V and VI

The expanded fireclay aggregate of Example I is a very desirable ingredient in the manufacture of monolithic refractory linings. These linings are placed by casting (as concrete), ramming or tamping in place, or by pneumatic placement known in the art as "gunning." Example V is a monolithic refractory mix made from size graded lightweight aggregate of Example I combined with plastic bond clay and refractory calcium aluminate cement. Table IV includes the batches of Example V and of Example VI which is a typical fireclay castable.

TABLE IV

| | Example V | Example VI |
|---|---|---|
| Lightweight Aggregate, percent: | | |
| −4+10 mesh | 30 | |
| −10+28 mesh | 20 | |
| −28+65 mesh | 15 | |
| −65 mesh | 10 | |
| High Purity Calcined Fire Clay, percent: | | |
| −4+10 mesh | | 30 |
| −10+28 mesh | | 20 |
| −28+65 mesh | | 15 |
| −65 mesh | | 10 |
| Plastic Bond Clay | 5 | 5 |
| Calcium Aluminate Cement | 20 | 20 |
| Water Added | 15-20 | 15-20 |

Both mixes were cast into molds with the aid of vibration. After curing and drying at 230° F. for 5 hours the brick were tested for strength and density. The results are given in the following table.

TABLE V

| | Example V | Example VI |
|---|---|---|
| Bulk Density, p.c.f. | 101 | 120 |
| Modulus of Rupture, p.s.i. | 400 | 400-700 |
| Cold Crushing Strength, p.s.i. | 2,120 | 1,900-3,000 |

Example V made with the expanded fireclay aggregate of this invention has a bulk density of 20 p.c.f. lower than the typical fireclay castable, Example VI, but retains the same strength at room temperature. Because the lightweight aggregate of Example V is very refractory, it will have strength equivalent to the standard fireclay castable at elevated temperatures. Lightweight monolithic refractories made with the typical nonrefractory aggregates would not. Therefore, applicant has discovered a unique method of making a lightweight aggregate which, when used as an ingredient in monolithic refractories, provides lower bulk densities without compromising strengths at elevated temperatures.

The calcium aluminate cement used in Examples V and VI is of the high-purity type. That is, it contains no more than 3% impurities and at least 70% $Al_2O_3$; the remainder is CaO.

The percentages of plastic bond clay and calcium aluminate cement used with the refractory aggregate can vary somewhat as can the grind of the total batch. This is well understood in the art. A workable batch contains 10 to 40% calcium aluminate cement, 2 to 10% bond clay, the remainder being aggregate. A workable grind will have at least about 40% held on a 28 mesh screen and at least about 30% passing −65 mesh screen.

Having now described the preferred embodiments of the invention in accordance with the patent statutes, it is desired to have protected by Letters Patent what is enumerated in the following appended claims.

I claim:

1. A method of making a lightweight refractory aggregate which comprises the steps of selecting an argillaceous material having a chemical analysis on a calcined oxide basis, by weight, about 50 to about 60% $SiO_2$, about 40 to about 50% $Al_2O_3$, between about 2.5 and about 7.5% other oxides including alkali oxides, alkaline earth oxides, and $TiO_2$, the total alkalies and alkaline earths less than about 1%, the $TiO_2$ less than about 2%; crushing the argillaceous material to substantially all pass 1½″ screens and screening out minus 4 mesh argillaceous material, burning the minus 1½ plus 4 mesh material in a rotary kiln so that it is in the hot zone for about 1 hour at about 2900° F. with 5 to 10% excess air, recovering an aggregate which has a bulk density between about 1.63 and about 1.72 grams per cubic centimeter.

2. A method of making a lightweight refractory aggregate which comprises the steps of selecting an argillaceous material having a chemical analysis on a calcined oxide basis, by weight, about 50 to about 60% $SiO_2$, about 40 to about 50% $Al_2O_3$, between about 2.5 and about 7.5% other oxides including alkali oxides, alkaline earth oxides, and $TiO_2$, the total alkalies and alkaline earth oxides less than about 1%, the $TiO_2$ less than about 2%, crushing the argillaceous material to minus 1½″ screens and plus 4 mesh and passing the crushed material through a rotary kiln with 5 to 10% excess air at a temperature of about 2900° F., recovering an aggregate having a bulk density between 1.63 and about 1.72 grams per cubic centimeter.

3. An expanded refractory aggregate having a chemical analysis on a calcined oxide basis, by weight, about 50 to about 60% $SiO_2$, about 40 to about 50% $Al_2O_3$, between about 2.5 and about 7.5% other oxides including alkali oxides, alkaline earth oxides, and $TiO_2$, the total alkali and alkaline earth oxides less than about 1%, the $TiO_2$ less than about 2%, and a bulk density between about 1.63 and about 1.72 grams per cubic centimeter.

4. A lightweight fireclay brick made from a batch containing an effective bonding amount of plastic bond clay and the remainder comprising substantially lightweight fireclay aggregate, said aggregate having a chemical analysis on a calcined oxide basis, by weight, 50 to 60% $SiO_2$, about 40 to about 50% $Al_2O_3$, between about 2.5 and about 7.5% other oxides including alkali oxides, alkaline earth oxides, and $TiO_2$, the total alkali and alkaline earth oxides less than about 1%, the $TiO_2$ less than about 2%, said aggregate having a bulk density between about 1.63 and about 1.72 grams per cubic centimeter.

5. The lightweight fireclay brick of claim 4 in which the batch consists of about 2 to about 10% plastic bond clay, the remainder being lightweight refractory aggregate sized so that at least about 35% remains on a 28 mesh screen and at least about 30% passes a 65 mesh screen.

6. A refractory composition consisting essentially of from about 2 to about 10% of plastic bond clay, from about 10 to about 40% high-purity calcium aluminate cement and lightweight refractory aggregate having a chemical analysis on a calcined oxide basis, by weight, about 50 to about 60% $SiO_2$, about 40 to about 50% $Al_2O_3$, between about 2.5 and about 7.5% other oxides including alkali oxides, alkaline earth oxides, and $TiO_2$, the total alkali and alkaline earth oxides less than about 1%, the $TiO_2$ less than about 2%, said aggregate having a bulk density between about 1.63 and about 1.72 grams per cubic centimeter.

7. The refractory composition of claim 6 wherein the plastic bond clay is present from about 2 to about 10%, the high-purity calcium aluminate cement is present from about 10 to about 40%, the remainder being lightweight refractory aggregate, at least about 40% of the total batch being held on a 28 mesh screen and at least about 30% passing a 65 mesh screen.

References Cited

UNITED STATES PATENTS

| | | | |
|---|---|---|---|
| 1,707,395 | 4/1929 | Hayde | 106—40 |
| 1,893,313 | 1/1933 | Willetts | 106—67 |
| 3,181,959 | 5/1965 | Raine et al. | 106—64 |
| 3,227,568 | 1/1966 | Stock et al. | 106—67 |
| 3,341,339 | 9/1967 | Stein | 106—64 |

JAMES E. POER, *Primary Examiner.*

U.S. Cl. X. R.

106—40, 67, 288